No. 802,742. PATENTED OCT. 24, 1905.
G. ERICSON.
BUTTER CUTTER AND MEASURER.
APPLICATION FILED APR. 11, 1905.
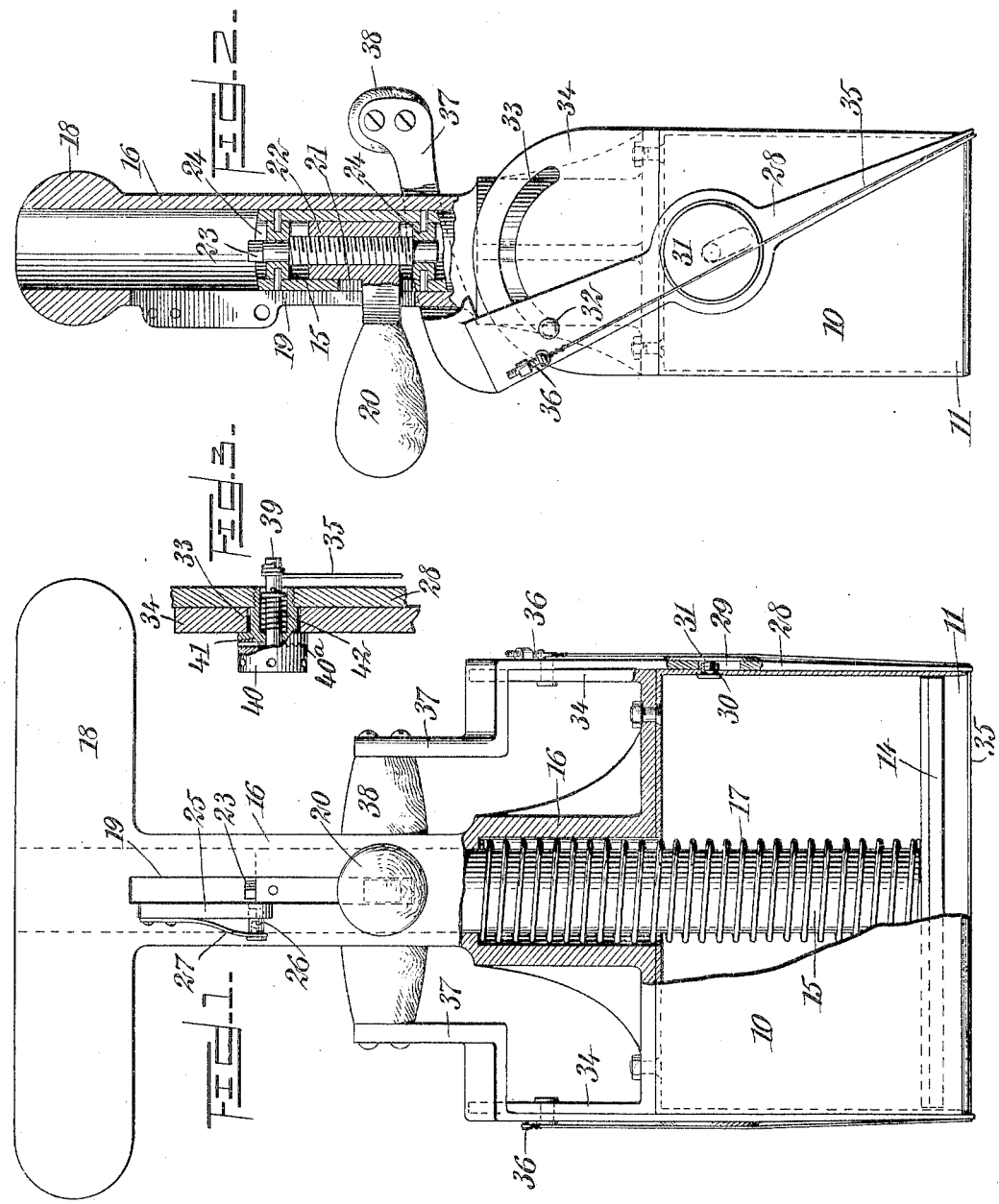
WITNESSES:
INVENTOR
Gottfrid Ericson
BY
ATTORNEYS

UNITED STATES PATENT OFFICE.

GOTTFRID ERICSON, OF BROOKLYN, NEW YORK.

BUTTER CUTTER AND MEASURER.

No. 802,742.      Specification of Letters Patent.      Patented Oct. 24, 1905.

Application filed April 11, 1905. Serial No. 254,908.

*To all whom it may concern:*

Be it known that I, GOTTFRID ERICSON, a citizen of the United States, and a resident of the city of New York, borough of Brooklyn, in the county of Kings and State of New York, have invented a new and Improved Butter Cutter and Measurer, of which the following is a full, clear, and exact description.

The invention relates to a novel means for cutting out from a larger mass of butter a print or regularly-formed block and for simultaneously weighing or measuring the same.

Reference is to be had to the accompanying drawings, which illustrate the preferred embodiment of my invention, in which drawings like characters of reference indicate like parts in the several views, and in which—

Figure 1 is a side view with parts broken away. Fig. 2 is an end view, also with parts broken away; and Fig. 3 is a partly-sectional detail view of a modified form of the invention.

10 indicates a rectangular box which is open at the end 11 to permit it being pushed into a mass of butter, so that a quantity of butter will be received within the box.

14 indicates a follower which is movable toward and from the open end of the box. The follower has a stem 15 attached thereto, which slides freely through a sleeve 16, projecting from the closed end of the box opposite the open end 11.

17 indicates a spring which tends to push the follower 14 outward toward the open end of the box, the follower moving back toward the opposite or closed end as the butter enters the box.

The sleeve 16 is extended beyond the box and has a transverse portion 18 forming a handle, the end of the sleeve being open for the purpose which will hereinafter appear. Said sleeve is formed with a slot 19, and through this slot projects the shank of the handle 20, by which the follower 14 is manually operated. The stem 15 of the follower 14 has a slot 21 therein, through which the shank of the handle 20 loosely projects, and within the hollow stem 15 is located a nut 22, which is attached to the handle. Operating in the nut is a screw 23, said screw being revolubly held in a bearing 24, secured within the stem 15. The upper end of the screw 23 is angular, so as to permit engaging a socket-wrench therewith, and said wrench may be inserted through the open end of the sleeve 16. It will be observed that by operating the screw 23 the position of the handle 20 with respect to the stem 15, and consequently to the follower 14, may be regulated. The sleeve 16 has a flange 25 formed thereon, and this flange is orificed to receive a stop 26. The stop 26 is held in inactive position by means of a spring 27. The stop 26 may be manually pushed in, so as to lie on the shank of the handle 20, so as to limit the inward movement of the follower. Upon inserting the box 10 into a mass of butter the butter entering the box will push the follower 14 back. This backward movement will continue if the stop 26 is left inactive until the handle strikes the outer extremity of the slot 19. According to the present embodiment of my invention the parts will be so proportioned that when this takes place exactly one pound of butter will have entered the box. By operating the screw 23 the parts may be adjusted so as to account for any irregularity in this action. By pushing the stop 26 inward into the path of the handle 20 the handle will be stopped when one-half pound or any fraction of a pound has been received in the box.

Located at each side of the box 10 is an arm 28. These arms are formed with slots 29, which receive pivots mounting the arms on the box. These pivots comprise internally-threaded headed tubes 30, projecting through the openings in the box 10 and receiving headed screws 31. The screws 31 form with the tubes 30 the pivots mounting the arms, and the heads of the screws cover the slots 29 in the arms, so as to give the device a smooth exterior form and prevent the entry of butter into the slots. The arms 28 have pins 32 attached thereto, and these pins run in slots 33, formed in flanges 34, attached to the box. The slots 33 and pins 32 serve to give the arms 28 a sliding movement simultaneously with the rocking movement, so as to cause the outer ends of the arms to move true along the front edges of the box at the open end 11 thereof. Stretched across between the front ends of the arms 28 is a cutting-wire 35. This wire is extended up the sides of the arms 28 and is provided with a device 36 for connecting the wire to the arms and also for adjusting the tension thereof. Projecting from the arms 28 are lugs 37, which are joined to a handle 38, by means of which the arms may be operated.

In the operation of the device the handle 38 is thrown to the position shown in Fig. 2, thus placing the wire 35 at one side of the box 10. The open end of the box is then forced into the mass of butter until the movement of the follower 14 is arrested either by the end wall of the slot 19 or the stop 26, as the case may be. When this takes place, the desired amount of butter will have been received within the box, after which it is only necessary to swing the handle 38 so as to sweep the cutting-wire 35 across the open end of the box, thus cutting off the butter which has been received within the same. This butter may subsequently be ejected from the box by pressing in the handle 18, so as to move the follower back to the open end of the box. Fig. 3 indicates a modification of the invention in which the cutting-wire 35 is held at one end by a pin 39. This pin 39 has attached thereto a head 40 with ratchet-teeth $40^a$ thereon. The pin 39 fits loosely in a sleeve 41, which is mounted loosely in the slot 33 of one of the flanges 34. Said sleeve 41 is fastened to the arm 28. 42 indicates a spring which presses the pin 39, so as to hold the head 40 with its ratchet-teeth $40^a$ engaged with corresponding teeth formed on the sleeve 41. This device serves the double function of guiding the sliding movement of the arms 28 and of adjustably holding the cutting-wire 35. By operating the head 40 and pin 39 the tension of the wire may be regulated at will.

Having thus described the preferred form of my invention, what I claim as new, and desire to secure by Letters Patent, is—

1. In a butter-cutting device, the combination of a box having an open end, a follower in the box, a sleeve attached to the box, a stem attached to the follower and sliding in the sleeve, the said sleeve having a slot therein, a handle fitting loosely in the slot, a nut attached to the handle, and a screw mounted on the stem and coacting with the nut, for the purpose specified.

2. In a butter-cutting device, the combination of a box having an open end, a follower arranged to move in the box, a sleeve attached to the box and having a slot therein, a stem attached to the follower and movable through the sleeve, a nut located within the stem, a screw mounted on the stem and coacting with the nut, for the purpose specified, the stem having a slot therein adjacent to the nut, and a handle attached to the nut and projecting through the slots in the stem and in the sleeve.

3. A butter-cutting device comprising the combination of a box having an open end, an arm arranged to swing on the box, a cutting device carried by the arm, a sleeve attached to said arm, a member attached to the box and having a cam-slot therein in which the sleeve is loosely fitted, a pin arranged to turn in the sleeve and connected with the cutting device to adjust the same, a head attached to the pin and adapted to engage the sleeve, and means for yieldingly pressing the said head into engagement with the sleeve.

In testimony whereof I have signed my name to this specification in the presence of two subscribing witnesses.

GOTTFRID ERICSON.

Witnesses:
ISAAC B. OWENS,
JNO. M. RITTER.